(12) United States Patent
Duffie, III et al.

(10) Patent No.: US 7,389,357 B2
(45) Date of Patent: Jun. 17, 2008

(54) ARRANGEMENT IN AN IP NODE FOR PRESERVING SECURITY-BASED SEQUENCES BY ORDERING IP PACKETS ACCORDING TO QUALITY OF SERVICE REQUIREMENTS PRIOR TO ENCRYPTION

(75) Inventors: John Brawner Duffie, III, Cary, NC (US); Theodore Michael Hannock, Raleigh, NC (US); Steven Robert Ochmanski, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 10/759,182

(22) Filed: Jan. 20, 2004

(65) Prior Publication Data

US 2005/0182833 A1  Aug. 18, 2005

(51) Int. Cl.
*G06F 15/16* (2006.01)
*G06F 15/173* (2006.01)

(52) U.S. Cl. .................. 709/235; 709/240; 709/229; 709/231; 709/245

(58) Field of Classification Search ................ 709/245, 709/235, 231, 240
See application file for complete search history.

(56) References Cited

U.S. PATENT DOCUMENTS

| | | | | |
|---|---|---|---|---|
| 6,092,113 A * | 7/2000 | Maeshima et al. | .......... | 709/230 |
| 6,496,867 B1 * | 12/2002 | Beser et al. | .......... | 709/245 |
| 6,725,371 B1 * | 4/2004 | Verhoorn et al. | .......... | 713/161 |
| 6,795,920 B1 * | 9/2004 | Bacha et al. | .......... | 713/189 |
| 7,111,163 B1 * | 9/2006 | Haney | .......... | 713/153 |
| 2002/0031126 A1 * | 3/2002 | Crichton et al. | .......... | 370/394 |
| 2002/0032797 A1 * | 3/2002 | Xu | .......... | 709/238 |
| 2002/0116464 A1 * | 8/2002 | Mak | .......... | 709/206 |
| 2003/0051130 A1 * | 3/2003 | MeLampy et al. | .......... | 713/153 |
| 2003/0086411 A1 * | 5/2003 | Vassilovski | .......... | 370/352 |
| 2003/0093563 A1 * | 5/2003 | Young et al. | .......... | 709/245 |

OTHER PUBLICATIONS

Kent et al., "Security Architecture for the Internet Protocol", Request for Comments: 2401, Network Working Group, Nov. 1998.
Maughan et al., "Internet Security Association and Key Management Protocol (ISAKMP)", Request for Comments: 2408, Network Working Group, Nov. 1998.
Harkins et al., "The Internet Key Exchange (IKE)", Request for Comments: 2409, Network Working Group, Nov. 1998.
Ramakrishnan et al, "The Addition of Explicit Congestion Notification (ECN) to IP", Request for Comments: 3168, Network Working Group, Sep. 2001.

* cited by examiner

*Primary Examiner*—William C. Vaughn, Jr.
*Assistant Examiner*—Ranodhi N Serrao
(74) *Attorney, Agent, or Firm*—Leon R. Turkevich (57) ABSTRACT

A router has at least one outbound interface configured for establishing multiple IP-based secure connections (i.e., tunnels) with respective destinations based on transmission of encrypted data packets via the IP-based secure connections. The encrypted data packets are generated by a cryptographic module, where each encrypted packet successively output from the cryptographic module includes a corresponding successively-unique sequence number. The supply of data packets to the cryptographic module is controlled by a queue controller: the queue controller assigns, for each secure connection, a corresponding queuing module configured for outputting a group of data packets associated with the corresponding secure connection according to a corresponding assigned maximum output bandwidth. Each queuing module also is configured for reordering the corresponding group of data packets according to a determined quality of service policy and the corresponding assigned maximum output bandwidth.

31 Claims, 6 Drawing Sheets

ARRANGEMENT IN AN IP NODE FOR PRESERVING SECURITY-BASED SEQUENCES BY ORDERING IP PACKETS ACCORDING TO QUALITY OF SERVICE REQUIREMENTS PRIOR TO ENCRYPTION

BACKGROUND OF THE INVENTION

1. Field of the Invention

The present invention relates to transport of Internet Protocol (IP) packets, requiring a guaranteed quality of service (QoS), via secure IP connections.

2. Description of the Related Art

The development of newer protocols for Internet Protocol (IP) networks has extended the capabilities of IP networks. For example, deployment of QoS policies in IP networks has enabled the reliable transport of time-sensitive media data, including audio, video, Voice over IP (VoIP), etc., based on prioritizing the transport of data packets.

In particular, data packets identified as associated with latency-sensitive data traffic (e.g., audio, video, VoIP, etc.) are assigned a higher priority than other lower-priority data packets associated with, for example, Simple Mail Transfer Protocol (SMTP) or User Datagram Protocol (UDP) applications. Hence, an outbound interface in a router may include a high-priority queue (for high priority packets) and a low-priority queue (for low priority packets), enabling the packets to be output by the outbound interface according to their priority and determined capacity: if a network interface driver (i.e., an executable software resource configured for controlling the outbound interface) detects backpressure (i.e., congestion), the network interface driver will reorder outbound traffic based on priority of the data packets (e.g., by avoiding outputting packets from the low-priority queue until the high-priority queue has been emptied). Hence many QoS techniques will reorder packets, causing packets to be output in a sequence that differs from the order the packets were supplied to the outbound interface.

Problems also exist in maintaining a guaranteed quality of service in cases were a destination host is limited in its downstream capacity. For example, a broadband service provider may limit the downstream bandwidth available to a broadband subscriber; hence, even though a headend router is capable of outputting multiple 1024 kbps or higher (e.g., 1.5 Mb/s) media streams on a high-speed interface (e.g., T1 or higher), the destination router within the broadband network may be configured by the broadband service provider to limit the downstream bandwidth to a contracted rate of 1024 kbps.

Consequently, the destination router may drop downstream packets destined for the broadband subscriber if the amount of data traffic exceeds the contracted rate (e.g., 1024 kbps), for example in the case of a destination router receiving, for the broadband subscriber, a 1024 kbps media stream plus a burst of of SMTP packets. The result is reduced network efficiency due to the unnecessary waste of network resources utilized in generation, routing, and transmission of the data packets that ultimately were dropped by the destination router.

The development of secure IP connections involves IP packets passing through encrypted tunnels. In particular, secure IP tunnels have been used to establish virtual private networks (VPNs) between a local area network (e.g., a corporate LAN) and a remote node (e.g., a telecommuter's computer). In particular, a secure IP tunnel is established between the remote node (referred to as the VPN client) and a VPN server that separates the local area network via the wide area network.

The Internet Engineering Task Force (IETF) has published a Request for Comments (2401), by Kent et al., entitled "Security Architecture for the Internet Protocol" available on the IETF website at http://www.ietf.org/rfc/rfc2401.txt?number=2401, the disclosure of which is incorporated in its entirety herein by reference. The above-incorporated RFC 2401 discloses an architecture (referred to as IPSEC) for providing security services for IPv4 or IPv6 data packets at the IP layer, and uses a prescribed Authentication Header (AH) protocol and a prescribed Encapsulating Security Payload (ESP) protocol to provide traffic security. Both the AH protocol and the ESP protocol permit use of antireplay services (i.e., replay protection), where sequence numbers are added by a transmitting node (e.g., a VPN server) to IP packets being output as a data stream onto an encrypted tunnel.

According to RFC 2401, when a security association (SA) is established between a sender and a receiver, their respective counters (Sequence Counter in the sender and Anti-Replay Window in the receiver) are set to zero: the first packet sent by the sender has a sequence number of "1", the second packet sent by the sender has a sequence number of "2", etc., such that each successive packet output by the sender onto that SA has a corresponding successive sequence number.

Hence, the receiver can expect the received data packets to have a respective contiguous sequence of sequence numbers. If the receiver detects a packet having a sequence number that is out of order relative to a previously received packet, the receiver determines the detected packet is an invalid packet and can discard the packet.

The receiver configured for implementing replay protection according to RFC 2401 also will drop packets that are received out-of-order: if the receiver has received packets according to the sequence numbers "1, 2, 3, 4, 100, 101, 5", the receiver will drop the packet having the sequence number "5", since it is out of order relative to the packets having the sequence numbers "100" and "101".

As described above, many QoS techniques reorder packets. The IPSEC architecture, in contrast, requires packets to be received in order of the specified sequence numbers to ensure replay protection. Consequently, the inherent inconsistency between QoS techniques and the IPSEC architecture has caused unnecessary packet loss during past attempts at implementing IPSEC protocol and QoS policies on the same router interface.

In particular, attempts have been made to add IPSEC functionality to QoS-enabled routers in order to provide latency sensitive traffic (including voice and video) over Virtual Private Networks (VPN). Hence, voice and data packets must pass through encrypted tunnels. To date the voice and data packets have encountered IPSEC encryption and sequence number assignment prior to being passed to the outbound driver that performs the QoS functionality. Hence, any detection of congestion by the outbound driver causes reordering of packets such that the higher priority packets are at the front of the outbound queue.

Consequently, the decrypting peer, having detected an IPSEC sequence number that is out of order, drops the packets that were received out of order, even though the dropped packet is a valid, secure packet.

Although some encryption devices utilize queues before input to an encryption chip (i.e., integrated circuit), such queues have been used solely to prevent loss of data due to exceeding the input bandwidth of the encryption chip.

SUMMARY OF THE INVENTION

There is a need for an arrangement that enables latency sensitive traffic to be transported via encrypted tunnels, with guaranteed quality of service, without loss of packets due to reordering of packets bearing sequence numbers. There also is a need for an arrangement that enables transmission of data streams between secure tunnel endpoints with guaranteed of quality service, in a manner that minimizes packet loss between intermediate routers.

These and other needs are attained by the present invention, where a router has at least one outbound interface configured for establishing multiple IP-based secure connections (i.e., tunnels) with respective destinations based on transmission of encrypted data packets via the IP-based secure connections. The encrypted data packets are generated by a cryptographic module, where each encrypted packet successively output from the cryptographic module includes a corresponding successively-unique sequence number. The supply of data packets to the cryptographic module is controlled by a queue controller: the queue controller assigns, for each secure connection, a corresponding queuing module configured for outputting a group of data packets associated with the corresponding secure connection according to a corresponding assigned maximum output bandwidth. Each queuing module also is configured for reordering the corresponding group of data packets according to a determined quality of service policy and the corresponding assigned maximum output bandwidth.

Hence, the queue controller ensures that data packets are supplied to the cryptographic module in a manner that maintains quality of service policies for latency-sensitive traffic, while ensuring that the data packets are supplied in an order that ensures that quality of services policies implemented by the outbound interface have a minimal likelihood of reordering higher-priority packets. Hence, the queue controller ensures that the data flow remains below outbound interface congestion thresholds, minimizing the need for reordering packets in the outbound interface by QoS based queuing mechanisms. In addition, the queue controller can be configured to ensure that the assigned maximum output bandwidth corresponds to authorized bandwidth rates for a corresponding destination, minimizing the possibility that intermediate routers may drop the packets due to congestion on the downstream link to the destination.

One aspect of the present invention includes a method in a router having at least one outbound interface. The method includes establishing, on the outbound interface, a plurality of Internet Protocol (IP)-based secure connections with respective destinations based on receiving encrypted packets generated by a cryptographic module, each encrypted packet successively output from the cryptographic module having a corresponding successively-unique sequence number. The method also includes controlling supply of data packets to the cryptographic module. The supply of data packets is controlled by: (1) assigning, for each secure connection, a corresponding queuing module, (2) reordering, in each queuing module, a corresponding group of the data packets associated with the corresponding secure connection according to a determined quality of service policy and based on a corresponding assigned maximum output bandwidth for the corresponding queuing module, and (3) outputting to the cryptographic module the group of data packets, from each corresponding queuing module according to the corresponding assigned maximum output bandwidth, for generation of the encrypted packets. The method also includes outputting the encrypted packets from the cryptographic module to the one outbound interface for transport via their associated secure connections.

Another aspect of the present invention includes a router comprising a cryptographic module configured for successively outputting encrypted packets having respective successively-unique sequence numbers. The router also includes an outbound interface, and a queue controller. The outbound interface is configured for establishing a plurality of Internet Protocol (IP)-based secure connections with respective destinations based on receiving respective streams of the encrypted packets. The queue controller is configured for controlling supply of data packets to the cryptographic module, and also is configured for assigning, for each secure connection, a corresponding queuing module. Each queuing module configured for outputting to the cryptographic module a corresponding group of the data packets associated with the corresponding secure connection, and according to a corresponding assigned maximum output bandwidth for the corresponding queuing module, for generation of the corresponding stream of the encrypted packets. Each queuing module also is configured for selectively reordering the corresponding group of the data packets according to a determined quality of service policy and the corresponding assigned maximum output bandwidth.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
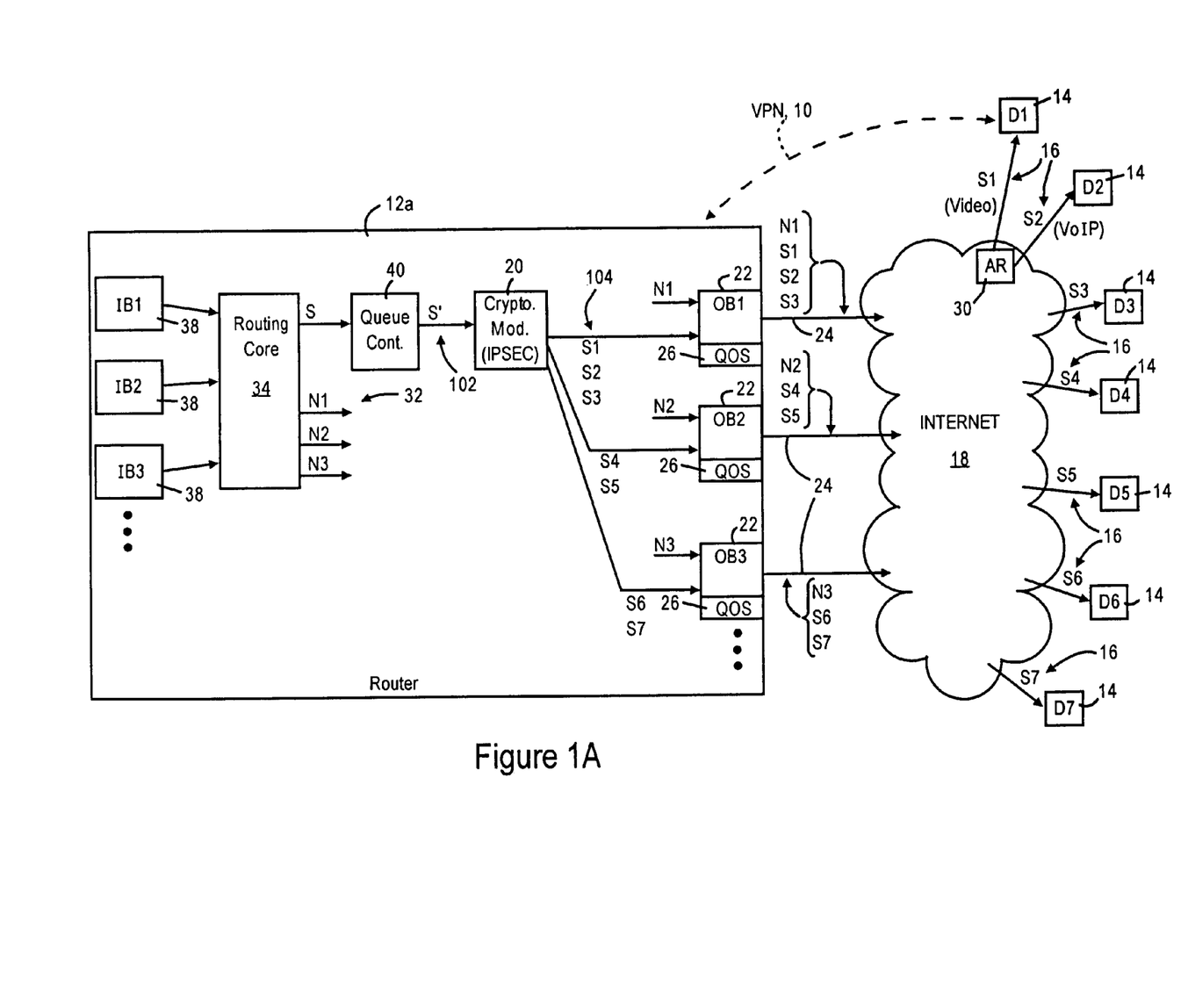
FIGS. 1A and 1B are diagrams illustrating routers configured for secure connections based on executing quality of service based queuing, for each secure connection, of packets prior to encryption, according to an embodiment of the present invention.
Figure 1B:
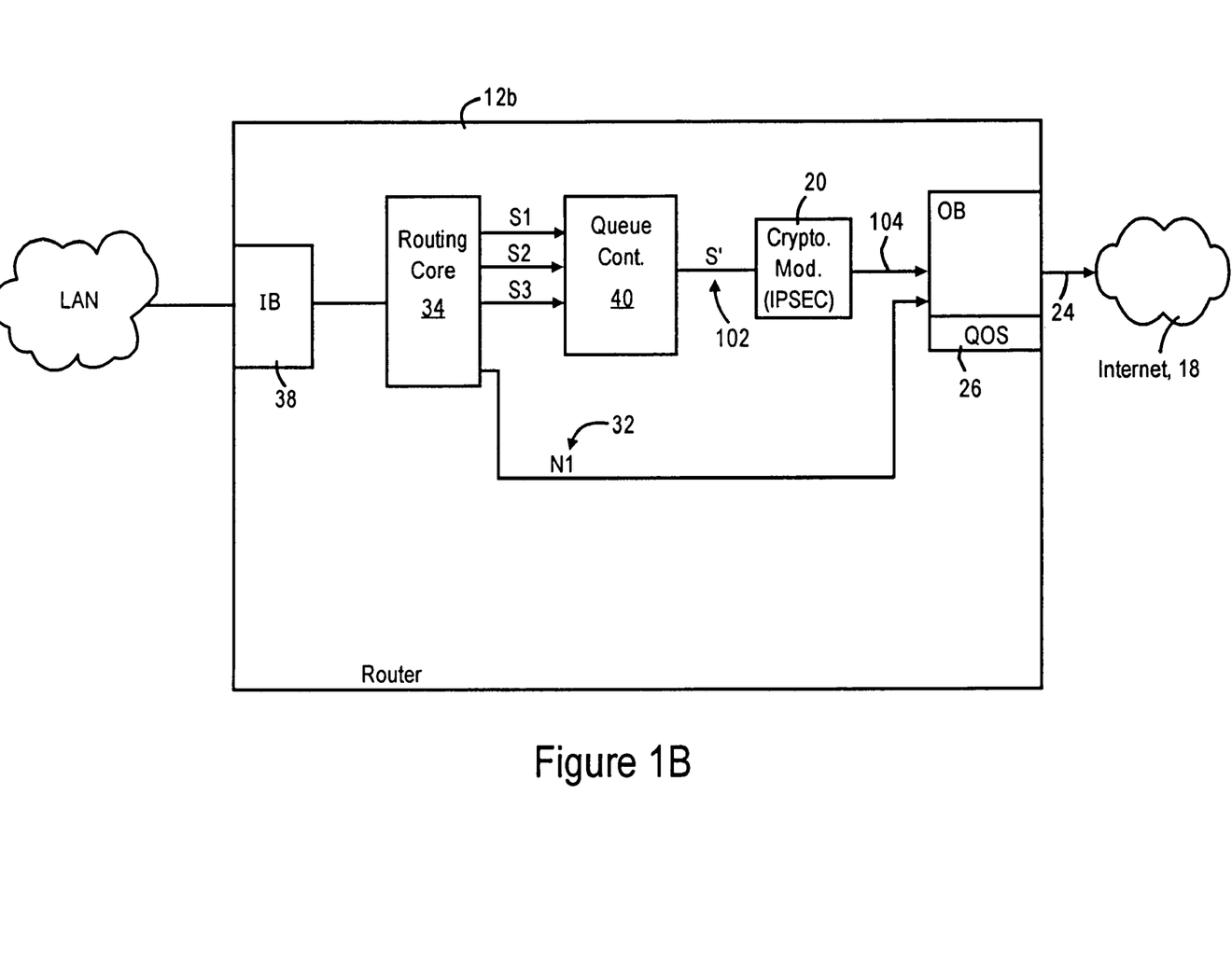

FIGS. 1A and 1B are diagrams illustrating routers 12*a* and 12*b*, respectively, configured for performing quality of service (QoS) based queuing for each secure connection and prior to encryption, according to an embodiment of the present invention. FIG. 1A illustrates a router 12*a* having multiple outbound interfaces 22, and FIG. 1B illustrates a router 12*b* having a single outbound interface 22 (e.g., a branch router having a LAN-based port and a WAN-based port). Hence, the disclosed embodiment can be implemented in a multiport router 12*a* or a router 12*b* having a single outbound interface 22.

Each of the routers 12*a* and 12*b* are configured for establishing secure connections 16 with destination endpoints (i.e., tunnel endpoints) via a wide area network. For example, FIG. 1A illustrates a virtual private network (VPN) 10 established between the router 12*a* and destination endpoints 14, via respective secure connections 16, over a wide area packet switched network 18 such as the Internet. In particular, the router 12*a* includes multiple outbound interfaces 22 (e.g., OB1, OB2, OB3, etc.), each configured for establishing a plurality of IP-based secure connections 16 (i.e., tunnels) with the respective destination tunnel endpoints 14 via the Internet 18. As illustrated in FIG. 1, the outbound interface 22 labeled "OB1" establishes the secure connections 16 labeled "S1", "S2", and "S3" with the destination tunnel endpoints 14 labeled "D1", "D2", and "D3", respectively; the outbound interface 22 labeled "OB2" establishes the secure connections 16 labeled "S4" and "S5" with the destination tunnel endpoints 14 labeled "D4" and "D5", respectively; and the outbound interface 22 labeled "OB3" establishes the secure connections "S6" and "S7" with the destination tunnel endpoints "D6" and "D7", respectively.

The secure connections 16 are established by each outbound interface 22 based on receiving encrypted packets 104 generated by a cryptographic module 20 according to IPSEC protocol. Hence, the destination endpoints 14 could be implemented as a router, a gateway, or a host computer, but in any case the destination endpoints are configured for terminating the secure connection 16 established between the router 12*a* or 12*b* and the destination endpoints 14.

In particular, each router 12*a* and 12*b* also includes a cryptographic module 20 configured for outputting encrypted packets 104 according to the IPSEC protocol as specified in RFC 2401. Each encrypted packet successively output by the cryptographic module 20 has a corresponding successively-unique sequence number, enabling the destination tunnel endpoints 14 to implement anti-replay procedures according to RFC 2401. As illustrated in FIG. 1A, the cryptographic module 20 is configured for outputting: the encrypted packets associated with the secure connections 16 labeled "S1", "S2", and "S3" to the outbound interface 22 labeled "OB1"; the encrypted packets associated with the secure connections 16 labeled "S4" and "S 5" to the outbound interface 22 labeled "OB2"; and the encrypted packets associated with the secure connections 16 labeled "S6" and "S7" to the outbound interface 22 labeled "OB3". FIG. 1B illustrates that the router 12*b* is configured for outputting the encrypted packets 104 associated with the secure connections 16 labeled "S1", "S2", and "S3" to the outbound interface 22 labeled "OB".

Each outbound interface 22 also includes a quality of service (QoS) module 26 configured for implementing a prescribed quality of service procedures in the event that the corresponding outbound interface 22 encounters congestion. In particular, an outbound interface 22 may encounter congestion if the incoming rate of data packets to be transmitted exceeds the available bandwidth on the corresponding outbound link 24. As illustrated in FIGS. 1A and 1B, the router 12 includes a routing core 34 configured for receiving IP packets from at least one inbound interface 38, and outputting non-encrypted data streams 32. The non-encrypted data streams 32 are illustrated in FIG. 1A as "N1", "N2", and "N3" and are output by the routing core 34 to the outbound interfaces 22 labeled "OB1", "OB2", and "OB3", respectively.

If congestion is detected in an outbound interface 22, the corresponding quality of service module 26 is configured to prioritize packets to provide a guaranteed quality of service for latency-sensitive traffic. As described above, however, the prioritizing of packets by the QoS module 26 may cause reordering of the encrypted packets output by the cryptographic module 20.

Concerns also arise in the case where a destination tunnel endpoint 14, for example the destination host computer/gateway/router 14 labeled "D1" is limited to a contracted bandwidth rate of 1024 kbps: if the destination tunnel endpoint 14 labeled "D1" were to receive downstream video traffic that exceeds the contracted bandwidth rate, then certain downstream packets may be dropped by an access router configured for enforcing the contracted bandwidth rate.

According to the disclosed embodiment, the routers 12*a* and 12*b* each include a queue controller 40 configured for controlling supply of data packets (S) that require encryption. In particular, the queue controller 40 is configured for assigning, for each secure connection 16, a corresponding queuing module, described in further detail below with respect to FIGS. 2-5. As described in further detail below, each queuing module is configured for outputting a group of data packets (e.g., 100*a*, illustrated in detail in FIGS. 2 and 5) associated with the corresponding secure connection according to a corresponding assigned maximum output bandwidth. Each queuing module also is configured for selectively reordering the corresponding group of data packets according to a determined quality of service policy and the corresponding assigned maximum output bandwidth.

Hence, the queue controller 40 ensures that the aggregate output (S') 102 of all the secure connections 14 is less than the input bandwidth of the cryptographic module 20. In addition, each queuing module can be configured to ensure that the packets destined for the corresponding secure connection 16 do not overwhelm the output bandwidth of the corresponding outbound interface 22, and preferably the bandwidth allocated to the subscriber and enforced by the access router 30.

Figure 2:
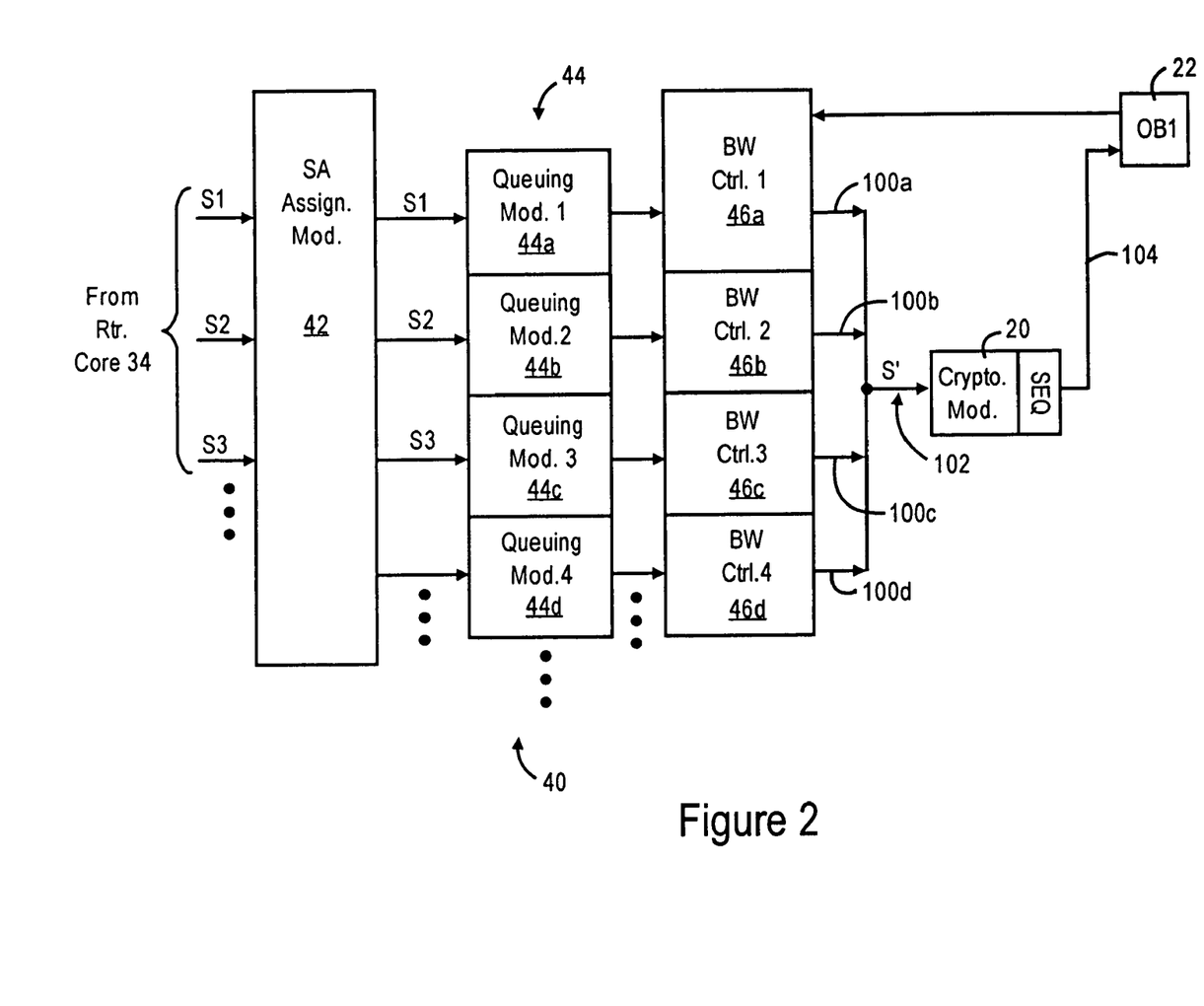
FIG. 2 is a diagram illustrating the queuing controller of FIG. 1, according to an embodiment of the present invention.

FIG. 2 is a diagram illustrating in detail the queue controller 40, according to an embodiment of the present invention. The queue controller 40 includes a security association (SA) assignment module 42 configured for assigning, for each IPSEC-based secure connection 16 (i.e., each Security Association 16), a corresponding queuing module 44. As illustrated in FIG. 2, the SA assignment module 42 assigns the queue modules 44*a*, 44*b*, 44*c*, and 44*d* to the secure connections 16 labeled "S1", "S2", "S3", and "S4", respectively. The flow of packets for the flows associated with the secure connections 16 labeled "S1", "S2", "S3", and "S4" are output by the routing core 34.

The queue controller 40 also assigns a bandwidth controller 46 to each corresponding queuing module 44. Each bandwidth controller 46 is controlling the output bandwidth for the corresponding queuing module (e.g, 44*a*), hence the bandwidth utilized for the corresponding secure connection 16. Preferably the prescribed threshold utilized by the bandwidth controller 46 is less than the threshold that would be utilized by the quality of service module 26 internal to the outbound interface 22, in order to avoid reordering by the quality of service module 26. Preferably the prescribed threshold utilized by the bandwidth controller 46 also is less than the input bandwidth limit of the cryptographic module 20. Further, each bandwidth controller 46 can be configured such that the sum of bandwidth assigned among the secure connections 16 is less than thresholds for the outbound interface 22 or the IPSEC module 20.

As illustrated in FIG. 2, the cryptographic chip 20 performs sequence number assignment (SEQ) to the encrypted packets before being output to the appropriate outbound interface 22.

Figure 3:
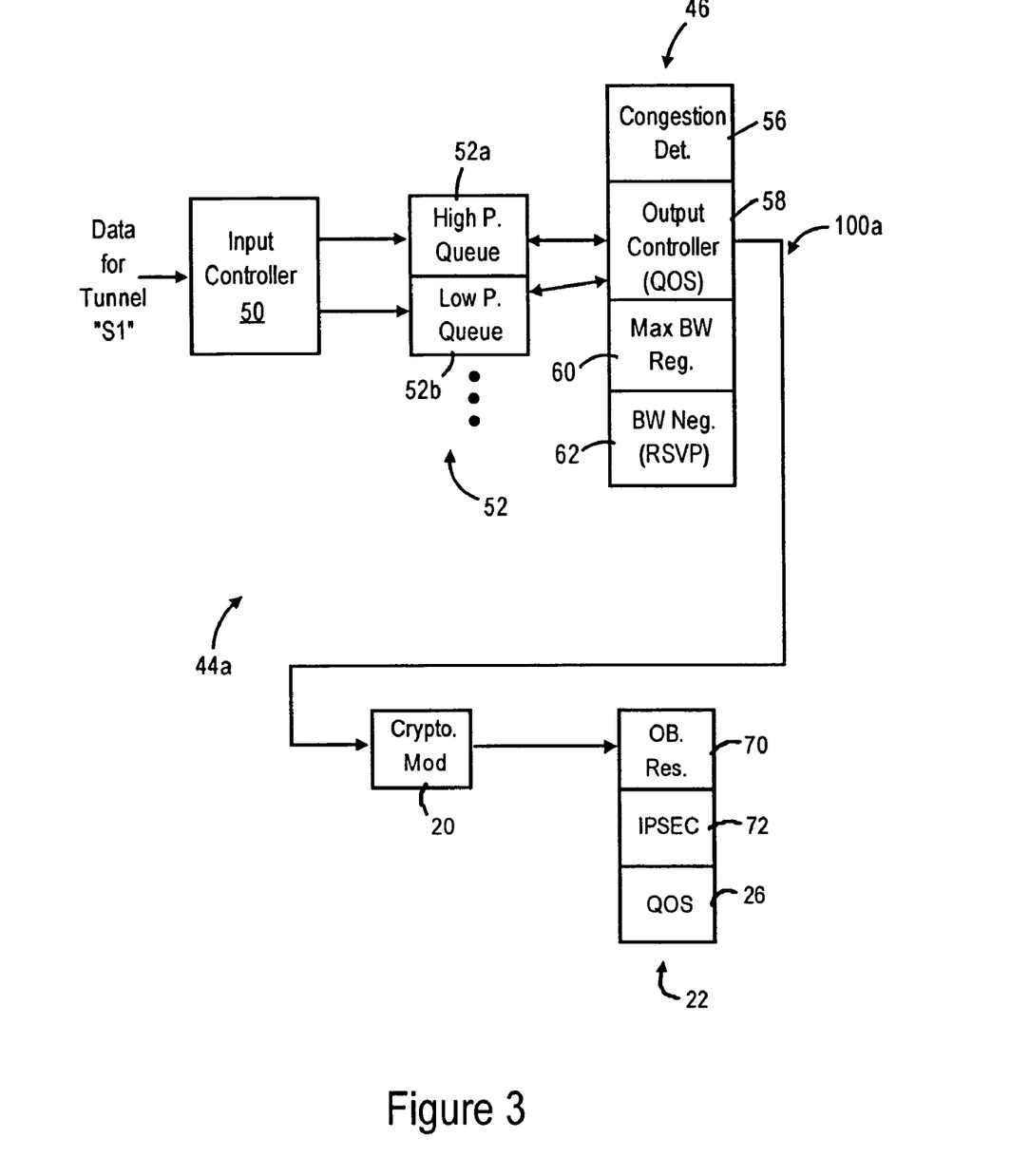
FIG. 3 is a diagram illustrating one of the queuing modules for a corresponding secure connection, according to an embodiment of the present invention.

FIG. 3 is a diagram illustrating in further detail an exemplary queue module 44 and the bandwidth controller 46, according to an embodiment of the present invention. Each queue module 44 includes an input controller 50, a packet queue 52, and a connection-specific bandwidth controller 46 configured for outputting to the cryptographic module 20 the group of data packets associated with the corresponding secure connection 16 (e.g., "S1"). In particular, the connection-specific bandwidth controller 46 includes a congestion detector 56, and output controller 58, a maximum output bandwidth register 60, and a bandwidth negotiator 62.

The input controller 50 is configured for storing each received data packet that is associated with the corresponding secure connection 16 (e.g., "S1") into one of a plurality of queues (e.g., 52a, 52b, etc.) having respective identified priorities (e.g., "High", "Low", etc.), based on a corresponding identified priority for each packet. As recognized in the art, packets may be prioritized based on packet type (e.g., VoIP, video, TCP, UDP, SMTP, etc.), or some other identifier. Once the packets are stored in the queues 52, the output controller 58 is configured for outputting the stored data packets to the cryptographic module 20 according to the corresponding assigned maximum output bandwidth specified in the register 60. The maximum output bandwidth specified in the register 60 may be manually configured, or may be inserted by the bandwidth negotiation resource 62. For example, the bandwidth negotiation resource 62 may utilize resource reservation protocol (RSVP) in order to communicate with the destination endpoint 14 to identify the maximum downstream bandwidth available to the destination endpoint 14 (e.g., 1024 kbps).

The output controller 58 also can be configured for selectively reordering the data packets stored in the buffers 52a and 52b, relative to the sequence received by the input controller 50, according to a determined quality of service policy in response to a detected congestion condition. The congestion condition may be generated the congestion detector 56. The congestion detector 56 is configured for monitoring the congestion levels in the assigned outbound interface and the levels specified in the output bandwidth register 60. Hence, if any of the above-described congestion levels are detected, the output controller 58 selectively reorders the stored data packets by outputting the data according to the priority queues, such that the high priority queue 52a would be given priority over the data stored in the low priority queue.

Also note that FIG. 3 illustrates that each outbound interface 22 includes an executable driver resource 70 configured for controlling operations of the outbound interface 22, including transfer of data from the cryptographic module 20 and onto the network link 24. Each outbound interface 22 also includes an executable IPSEC resource 72 configured for establishing the secure connections 16 according to IPSEC protocol, and the QoS module 26.

Figure 4:
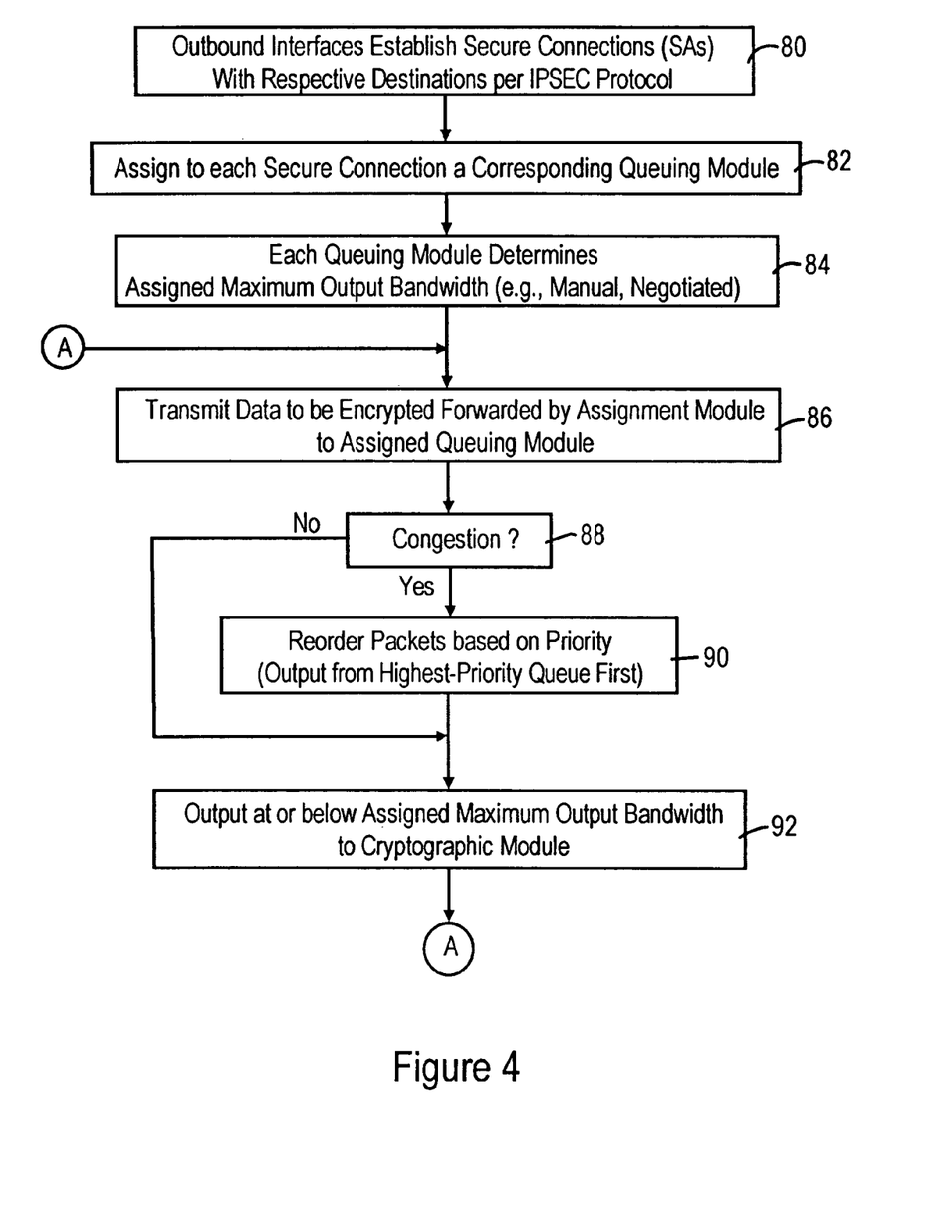
FIG. 4 is a diagram illustrating the method by the queuing controller of FIG. 1 of ordering packets for a given secure connection according to quality of service requirements prior to encryption, according to an embodiment of the present invention.

FIG. 4 is a diagram illustrating the method of ordering packets for a given secure connection according to quality of service requirements prior to encryption, according to an embodiment of the present invention. The steps described herein with respect to FIG. 4 can be implemented as executable code stored on a computer readable storage medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 80, where the IPSEC resources 72 in each of the outbound interfaces 22 establish the respective secure connections (i.e., Security Associations (SAs)) according to IPSEC protocol. The SA assignment module assigns to each secure connection 16 a corresponding queuing module 44 in step 82. Each queuing module 44 (e.g., 44a) determines in step 84 the corresponding assigned maximum output bandwidth to be used for the corresponding secure connection (e.g., S1). As described above, the assigned maximum output bandwidth may be obtained from a prior manual configuration, or based on the negotiation resource 62 obtaining the corresponding assigned maximum output bandwidth from the corresponding destination 14.

The transmit data (S) that is to be encrypted is routed by the routing core 34 to the queuing controller 40: the SA assignment module 42 forwards each data packet to the assigned queuing module 44 in step 86 based on the secure connection to be traversed by the data packet. The input controller 50 for the queuing module 44 stores each data packet in a selected queue (e.g., 52a, 52b, etc.) based on a determined priority.

The output controller 58 for the queuing module 44 then prepares to output the stored data packets to the cryptographic module 20 in accordance with the maximum permitted output bandwidth specified in the corresponding register 60: if in step 88 the output controller 58 for the corresponding queuing module 44 detects a congestion condition, the controller 58 reorders in step 90 the packets to be output based on priority, for example by outputting from the highest priority queue 52a, minimizing the probability that high priority packets will be dropped. Note that congestion in step 88 can be detected, for example based on the congestion detector 56, or based on the bandwidth controller detecting that levels in the queues 52 approaching congestion levels due to a higher rate of input data encountered by the input controller 50. The output controller 58 outputs the data packets at or below the assigned maximum output bandwidth to the cryptographic module 20 in step 92.

Note that the selective reordering based on congestion is optional: each queuing module (e.g., 44a) for a given secure connection 16 (e.g., S1) can be configured to reorder all packets according to priority, regardless of the presence of any congestion condition.

Figure 5:
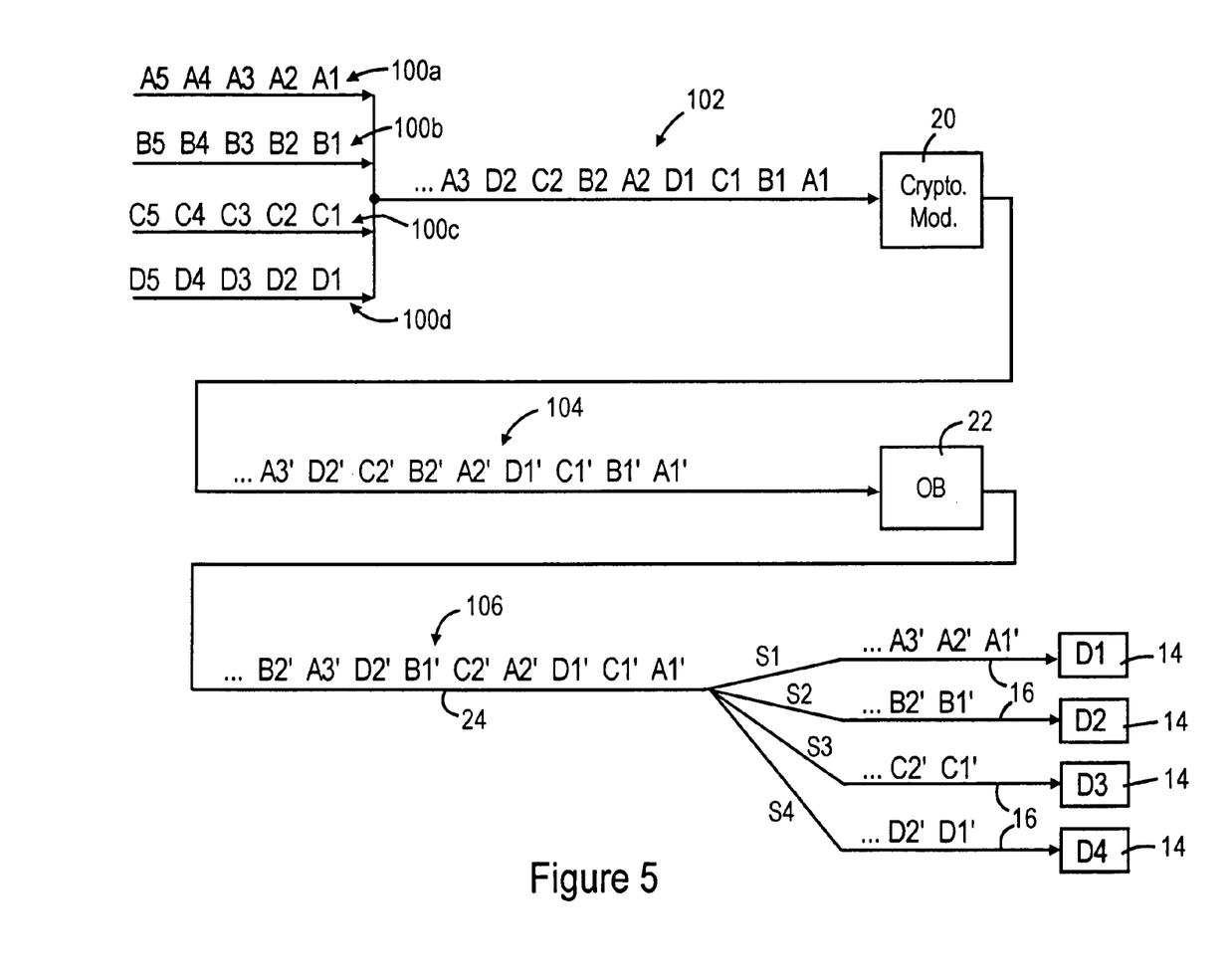
FIG. 5 is a diagram illustrating the ordering of packets by the queue controller of FIGS. 1A and 1B to minimize anti-replay effects, according to an embodiment of the present invention.

FIG. 5 is a diagram illustrating the reordering of packets by queuing modules, according to an embodiment of the present invention. The bandwidth controllers 46a, 46b, 46c, and 46d output respective streams of queued packets 100a, 100b, 100c, and 100d, for the respective secure tunnels S1, S2, S3, and S4. For example, the bandwidth controller 46a outputs the stream A1, A2, A3, A4, A5, etc. 100a for the secure connection S1; the bandwidth controller 46b outputs the stream B1, B2, B3, B4, B5, etc. 100b for the secure connection S2; the bandwidth controller 46c outputs the stream C1, C2, C3, C4, C5, etc. 100c for the secure connection S3; and the bandwidth controller 46d outputs the stream D1, D2, D3, D4, D5, etc. 100d for the secure connection S4. The streams 100a, 100b, 100c, and 100d are combined into a combined stream 102 and supplied to the cryptographic module 20 for encryption into encrypted packets 104 (e.g., A1', B1', C1', D1', etc.). The encrypted packets 104 are then supplied to the outbound interface 22: for simplicity, assume that only the single outbound interface 22 of FIG. 1B is utilized.

Assume now that congestion encountered by the outbound interface 22 cause reordering of the packets, resulting in the reordered stream 106 output on the outbound link 24. As illustrated in FIG. 5, the packets B1' and B2' associated with the stream 100b have been reordered relative to the other packets. However, the prior queuing by the queuing modules 44 on a per-secure tunnel basis ensures that the packets associated with the same secure tunnel remain in the appropriate order.

Hence, the encrypted packets (e.g., 100'a, 100'b, 100'c, and 100'd) for a given secure tunnel (e.g., S1, S2, S3, and S4) arrive at the corresponding destination 14 (e.g., D1, D2, D3, and D4) in the appropriate order, minimizing the probability of dropping packets due to anti-replay protection mechanisms in the destination endpoints 14.

According to the disclosed embodiment, reordering of encrypted packets having sequence numbers can be minimized, minimizing the unnecessary loss of of processor resources, cryptography engine resources, and bandwidth resources throughout the virtual private network 10. Further, low priority packets can be dropped or delayed prior to encryption, optimizing resources within the router.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router having at least one outbound interface, the method comprising:
    establishing, on the outbound interface, a plurality of Internet Protocol (IP)-based secure connections with respective destinations based on receiving encrypted packets generated by a cryptographic module, each encrypted packet successively output from the cryptographic module having a corresponding successively-unique sequence number;
    controlling supply of unencrypted data packets to the cryptographic module by:
    (1) assigning, for each secure connection, a corresponding queuing module,
    (2) reordering, in each queuing module, a corresponding group of the unencrypted data packets associated with the corresponding secure connection according to a determined quality of service policy and based on a corresponding assigned maximum output bandwidth for the corresponding queuing module, and
    (3) outputting to the cryptographic module the group of unencrypted data packets, from each corresponding queuing module according to the corresponding assigned maximum output bandwidth, for generation of the encrypted packets; and
    second outputting the encrypted packets from the cryptographic module to the outbound interface for transport via their associated secure connections;
    wherein the reordering step includes, in each queuing module, reordering the corresponding group of the unencrypted data packets according to the determined quality of service policy in response to detection of a congestion condition in the outbound interface.

2. The method of claim 1, wherein the reordering step includes, in each queuing module:
    establishing a plurality of queues having respective identified priorities;
    storing each unencrypted data packet associated with the corresponding secure connection in one of the queues based on a corresponding identified priority for said each unencrypted data packet; and
    selectively outputting the stored unencrypted data packets from the queues, according to the corresponding quality of service policy.

3. The method of claim 1, wherein:
    the establishing step includes establishing, on each of a plurality of the outbound interfaces, a corresponding plurality of the secure connections with a corresponding plurality of respective destinations based on receiving a corresponding stream of encrypted packets from the cryptographic module;
    the controlling step includes controlling the supply of unencrypted data packets, for each outbound interface, to the cryptographic module based on repeating the assigning, reordering, and outputting steps for each of the secure connections;
    the second outputting step including outputting each encrypted packet to a corresponding one of the outbound interfaces according to a routing decision executed by the router.

4. The method of claim 1, wherein the second outputting step includes outputting the encrypted packets for transport via their associated secure connections according to IP Security (IPSEC) protocol.

5. The method of claim 4, wherein the determined quality of service policy implements a guaranteed quality of service for one of a video stream or an audio stream.

6. The method of claim 5, wherein the audio stream is a Voice over IP media stream.

7. The method of claim 1, wherein the controlling step further includes obtaining, for each queuing module, the corresponding assigned maximum output bandwidth from a configuration register.

8. The method of claim 1, wherein the controlling step further includes negotiating, for at least one queuing module, the corresponding assigned maximum output bandwidth with the corresponding destination.

9. The method of claim 1, wherein each secure connection is a corresponding encrypted tunnel.

10. The method of claim 1, wherein: the router includes the outbound interface, the cryptographic module, and each of the queuing modules;
    the establishing of the IP-based secure connections, the controlling supply of unencrypted data packets, and the second outputting of the encrypted packets to the outbound interface each executed in the router.

11. The method of claim 1, further comprising:
    selecting one of the outbound interfaces for each of the unencrypted data packets by a routing circuit in the router based on receiving the unencrypted data packets from at least one inbound interface in the router;
    the second outputting including outputting each encrypted packet to the corresponding selected one of the outbound interfaces selected by the routing circuit.

12. A router comprising:
    a cryptographic module configured for successively outputting encrypted packets having respective successively-unique sequence numbers;
    an outbound interface configured for establishing a plurality of Internet Protocol (IP)-based secure connections with respective destinations based on receiving respective streams of the encrypted packets; and
    a queue controller configured for controlling supply of unencrypted data packets to the cryptographic module, the queue controller configured for assigning, for each secure connection, a corresponding queuing module, each queuing module configured for:
    (1) outputting to the cryptographic module a corresponding group of the unencrypted data packets associated with the corresponding secure connection, and according to a corresponding assigned maximum output bandwidth for the corresponding queuing module, for generation of the corresponding stream of the encrypted packets, and (2) reordering the corresponding group of the unencrypted data packets according to a determined quality of service policy and the corresponding assigned maximum output bandwidth;

wherein each queuing module is configured for reordering the corresponding group of the unencrypted data packets in response to detection of a congestion condition in the outbound interface having established the corresponding secure connection.

13. The router of claim 12, wherein each queuing module is configured for:
    establishing a plurality of queues having respective identified priorities;
    storing each unencrypted data packet associated with the corresponding secure connection in one of the queues based on a corresponding identified priority for said each unencrypted data packet; and
    selectively outputting the stored unencrypted data packets from the queues, according to the corresponding quality of service policy.

14. The router of claim 12, wherein the cryptographic module is configured for outputting the encrypted packets for transport via their associated secure connections according to IP Security (IPSEC) protocol.

15. The router of claim 14, wherein the determined quality of service policy implements a guaranteed quality of service for one of a video stream or an audio stream.

16. The router of claim 15, wherein the audio stream is a Voice over IP media stream.

17. The router of claim 12, wherein the queue controller includes a configuration register configured for storing, for each queuing module, the corresponding assigned maximum output bandwidth.

18. The router of claim 12, wherein the queue controller includes a peer bandwidth module configured for negotiating, for each queuing module, the corresponding assigned maximum output bandwidth with the corresponding destination.

19. The router of claim 12, wherein each secure connection is a corresponding encrypted tunnel.

20. The router of claim 12, further comprising a routing circuit configured for selecting one of a plurality of the outbound interfaces for each said unencrypted data packet, the cryptographic module configured for outputting each encrypted packet to the corresponding selected one of the outbound interfaces selected by the routing circuit.

21. A computer readable storage medium having stored thereon sequences of instructions for outputting encrypted packets by a router having at least one outbound interface, the sequences of instructions including instructions for:
    establishing, on the outbound interface, a plurality of Internet Protocol (IP)-based secure connections with respective destinations based on receiving encrypted packets generated by a cryptographic module, each encrypted packet successively output from the cryptographic module having a corresponding successively-unique sequence number;
    controlling supply of unencrypted data packets to the cryptographic module by:
    (1) assigning, for each secure connection, a corresponding queuing module,
    (2) reordering, in each queuing module, a corresponding group of the unencrypted data packets associated with the corresponding secure connection according to a determined quality of service policy and based on a corresponding assigned maximum output bandwidth for the corresponding queuing module, and
    (3) outputting to the cryptographic module the group of unencrypted data packets, from each corresponding queuing module according to the corresponding assigned maximum output bandwidth, for generation of the encrypted packets; and
    second outputting the encrypted packets from the cryptographic module to the outbound interface for transport via their associated secure connections;
    wherein the reordering step includes, in each queuing module, reordering the corresponding group of the unencrypted data packets according to the determined quality of service policy in response to detection of a congestion condition in the outbound interface.

22. The medium of claim 21, wherein the reordering step includes, in each queuing module:
    establishing a plurality of queues having respective identified priorities;
    storing each unencrypted data packet associated with the corresponding secure connection in one of the queues based on a corresponding identified priority for said each unencrypted data packet; and
    selectively outputting the stored unencrypted data packets from the queues, according to the corresponding quality of service policy.

23. The medium of claim 21, wherein:
    the establishing step includes establishing, on each of a plurality of the outbound interfaces, a corresponding plurality of the secure connections with a corresponding plurality of respective destinations based on receiving a corresponding stream of encrypted packets from the cryptographic module;
    the controlling step includes controlling the supply of unencrypted data packets, for each outbound interface, to the cryptographic module based on repeating the assigning, reordering, and outputting steps for each of the secure connections;
    the second outputting step including outputting each encrypted packet to a corresponding one of the outbound interfaces according to a routing decision executed by the router.

24. The medium of claim 21, wherein the second outputting step includes outputting the encrypted packets for transport via their associated secure connections according to IP Security (IPSEC) protocol.

25. A router having at least one outbound interface, the router further comprising:
    means for establishing, on the outbound interface, a plurality of Internet Protocol (IP)-based secure connections with respective destinations based on receiving encrypted packets;
    means for generating the encrypted packets, each encrypted packet successively output having a corresponding successively-unique sequence number; and
    means for controlling supply of unencrypted data packets to the generating means, including:
    (1) means for assigning, for each secure connection, a corresponding queuing means for queuing unencrypted data packets,
    (2) means for reordering, in each queuing means, a corresponding group of the unencrypted data packets associated with the corresponding secure connection according to a determined quality of service policy and based on a corresponding assigned maximum output bandwidth for the corresponding queuing means, the means for reordering configured for outputting to the generating means the group of unencrypted data packets, from each corresponding queuing means according to the corresponding assigned maximum output bandwidth, for generation of the encrypted packets;

wherein the means for reordering is configured for reordering, in each queuing means, the corresponding group of the unencrypted data packets according to the determined quality of service policy in response to detection of a congestion condition in the outbound interface.

26. The router of claim 25, wherein the means for reordering is configured for, in each queuing means:

establishing a plurality of queues having respective identified priorities;

storing each unencrypted data packet associated with the corresponding secure connection in one of the queues based on a corresponding identified priority for said each unencrypted data packet; and selectively outputting the stored unencrypted data packets from the queues, according to the corresponding quality of service policy.

27. The router of claim 25, wherein: the means for establishing is configured for establishing, on each of a plurality of the outbound interfaces, a corresponding plurality of the secure connections with a corresponding plurality of respective destinations based on receiving a corresponding stream of encrypted packets from the generating means;

the controlling means is configured for controlling the supply of unencrypted data packets, for each outbound interface, based on the assigning means assigning, for each secure connection for each outbound interface, a corresponding one of the queuing means;

the router further comprises routing means for selecting one of the outbound interfaces for each said unencrypted data packet, the generating means configured for outputting each encrypted packet to the corresponding selected one of the outbound interfaces selected by the routing means.

28. The router of claim 25, wherein the generating means is configured for outputting the encrypted packets for transport via their associated secure connections according to IP Security (IPSEC) protocol.

29. The router of claim 25, wherein the reordering means is configured for obtaining the corresponding assigned maximum output bandwidth from a configuration register.

30. The router of claim 25, wherein the reordering means further includes means for negotiating, for at least one queuing means, the corresponding assigned maximum output bandwidth with the corresponding destination.

31. The router of claim 25, wherein each secure connection is a corresponding encrypted tunnel.

* * * * *